(12) United States Patent
Pfahler

(10) Patent No.: US 10,948,098 B2
(45) Date of Patent: Mar. 16, 2021

(54) CIRCUIT ARRANGEMENT TO CONTROL SYSTEM AND SYSTEM WITH CIRCUIT ARRANGEMENT

(71) Applicant: Alfmeier Präzision SE, Treuchtlingen (DE)

(72) Inventor: Jürgen Pfahler, Meinheim (DE)

(73) Assignee: Alfmeier Präzision SE, Treuchtlingen (DE)

( * ) Notice: Subject to any disclaimer, the term of this patent is extended or adjusted under 35 U.S.C. 154(b) by 243 days.

(21) Appl. No.: 16/003,415

(22) Filed: Jun. 8, 2018

(65) Prior Publication Data

US 2018/0355991 A1 Dec. 13, 2018

(30) Foreign Application Priority Data

Jun. 9, 2017 (DE) .................. 10 2017 112 803

(51) Int. Cl.
| | |
|---|---|
| *B60N 2/66* | (2006.01) |
| *F16K 31/02* | (2006.01) |
| *B60N 2/23* | (2006.01) |
| *F16K 31/00* | (2006.01) |
| *B60N 2/90* | (2018.01) |

(52) U.S. Cl.
CPC .............. *F16K 31/025* (2013.01); *B60N 2/23* (2013.01); *B60N 2/665* (2015.04); *B60N 2/914* (2018.02); *B60N 2/929* (2018.02); *F16K 31/002* (2013.01); *B60N 2002/924* (2018.02)

(58) Field of Classification Search
CPC ...... B60N 2/914; B60N 2/665; B60N 2/0244; A47C 7/467

USPC ....................................................... 297/284.6
See application file for complete search history.

(56) References Cited

U.S. PATENT DOCUMENTS

| | | | | |
|---|---|---|---|---|
| 4,655,505 | A * | 4/1987 | Kashiwamura ........ | A47C 7/467 297/284.6 |
| 4,840,425 | A * | 6/1989 | Noble .................... | A47C 7/467 297/284.1 |
| 4,938,528 | A * | 7/1990 | Scott ...................... | A47C 7/467 297/284.6 |
| 2003/0038517 | A1* | 2/2003 | Moran ................... | B60N 2/914 297/284.3 |
| 2011/0227388 | A1* | 9/2011 | Bocsanyi ............. | B60N 2/4415 297/452.41 |
| 2015/0251179 | A1* | 9/2015 | Asai .................... | B01L 3/50273 422/505 |

FOREIGN PATENT DOCUMENTS

| | | |
|---|---|---|
| DE | 102008021444 | 11/2009 |
| DE | 112014006722 | 3/2017 |

OTHER PUBLICATIONS

German Office Action dated Apr. 25, 2018 with Machine Translation.

* cited by examiner

*Primary Examiner* — Sarah B McPartlin
(74) *Attorney, Agent, or Firm* — JK Intellectual Property Law, PA

(57) ABSTRACT

A circuit arrangement for controlling a system, and a system having a circuit arrangement, both suitable for use with a lumbar support with at least two air cushions, may include actuators, voltage supply paths, and electronic switching elements.

4 Claims, 4 Drawing Sheets

CIRCUIT ARRANGEMENT TO CONTROL SYSTEM AND SYSTEM WITH CIRCUIT ARRANGEMENT

CROSS-REFERENCE TO RELATED APPLICATION

This application claims benefit to German Patent Application Number 102017112803.4, filed Jun. 9, 2017, which is incorporated in its entirety by reference herein.

TECHNICAL FIELD

The disclosure relates to a circuit arrangement to control a system, especially a lumbar support with at least two air cushions, and a system with such a circuit arrangement.

BACKGROUND

Systems called lumbar support, which can especially be pneumatically adjusted and integrated into a seat such as a car seat, are used to increase seating comfort. To adjust the backrest of the seat, the system comprises several air cushions filled with air that can be deflated once again in order to change the contour of the seat or backrest. To inflate or deflate them, the air cushions are typically connected to a pneumatic pump via supply lines and to the ambient atmosphere, in which case valves are arranged in the supply lines for opening and closing. The valves themselves are in each case adjusted by actuators for which generally electromagnets are used.

Furthermore, actuators based on wires made of SMA (shape memory alloys) elements are used in which a positioning element of the actuator is activated when current is supplied to the SMA element. If a supply voltage is fed to an actuator or its SMA element, power is supplied to it and the actuator is activated. In this case, the power supplied must be maintained within a very narrowly defined range to ensure the reliable activation of the actuator and nonetheless prevent a thermal overload, which would damage the SMA element permanently. However, in practical use, this is often problematic, as the supply voltage is subject to large fluctuations, especially when used in the automotive sector, and when excessive current is fed to the SMA elements with direct contact. Moreover, the power supplied should typically be varied depending on the surrounding temperature, so that less power is supplied with a higher surrounding temperature than with a lower surrounding temperature in order not to overload the SMA element once again.

To ensure a reliable functionality of the SMA elements and actuators, it is known for example to integrate the actuators into a circuit arrangement with a control unit that takes over the most varied tasks, especially a measurement of the supply voltage and the surrounding temperature by means of the temperature sensors integrated into the control unit. Here, the SMA elements are controlled via pulse width modulation, wherein depending on the measured supply voltage and temperature of the duty cycle of the pulse width modulation, hence the ratio of pulse width to period duration, is adjusted. Another option consists of using a power source controlled by a control unit to adjust the current flowing through the SMA elements or using temperature-dependent power sources, wherein one power source must be available for each actuator.

Therefore, the known circuit arrangements or methods are elaborate and expensive because of the components needed, e.g. control unit, temperature sensors or power sources. In addition, many components are necessary, such as one power source for every actuator. Furthermore, due to the power loss occurring in the power sources, which must necessarily be dissipated to the surroundings in order to prevent the circuit and its components from overheating, no compact design is possible, although desirable, especially when used in a car seat.

SUMMARY

It is therefore the task of the disclosed subject matter to suggest a circuit arrangement to control a system, particularly a lumbar support, and a system with such a circuit arrangement in which the above-mentioned disadvantages can be prevented without limiting functionality.

The task mentioned first is solved by a circuit arrangement to control a system, especially a lumbar support, with at least two air cushions having the characteristics according to aspects of the present disclosure. The circuit arrangement comprises at least four actuators with at least one adjusting element in each case, wherein each positioning element can be adjusted between a first position and a second position. Furthermore, the circuit arrangement comprises at least one supply voltage path and a ground path, which form at least four current paths among them, wherein the at least four actuators are integrated to activate the respective positioning element between the supply voltage path and the ground path in such a way in a circuit or in the circuit arrangement that two actuators can in each case be switched pairwise in series in one of the current paths and fed with current. To deactivate all possible current paths or the activate one of the current paths, the circuit arrangement includes electronic switching elements to feed current to no current paths at all and/or to one of the two actuators in the current paths connected in series.

Thus, with the help of the electronic switching elements, the current path through which current should flow can be selected, therefore an activation of the current path and a change between the various current paths. Depending on which one of the current paths is activated so current can flow through it, current is fed jointly (in other words, simultaneously) to two of the actuators and their positioning elements are in each case moved from their first position to their second position. By activating different current paths, it is therefore possible in each case to activate two different actuators and thus achieve several of the system's switching states. If all current paths are inactive, no current therefore flows through the circuit and all actuators are inactive.

The switching of the actuators in each case in pairs and flexibly in a current path makes it possible that in each case two of the actuators necessary for the corresponding control of the system or for executing a function of the system are simultaneously activated without the need for numerous components.

The at least four current paths are preferably formed in that one circuit integrated into the circuit arrangement includes at least one parallel circuit with at least two parallel branches, wherein in each one of the at least two parallel branches at least two actuators are arranged in series, and that the at least two parallel branches of the parallel circuit can be connected or linked to one another in such a way by means of an additional branch that an actuator arranged in a first parallel branch can be connected in series to an actuator arranged in a second parallel branch.

In other words: The two parallel branches of the parallel circuit form in each case one current path with in each case two actuators, a first and a second actuator connected in series, thus two current paths, which run between the supply voltage path and the ground path. The other branch connects the two parallel branches between the two actuators in such a way that a first actuator of the first parallel branch can be connected together in series to a second actuator of the second parallel branch to form a third current path, and a first actuator of the second parallel branch with a second actuator of the first parallel branch to form a fourth current path. Current can be fed jointly to the two actuators, which in each case form one common current path, and thus they can be jointly activated.

If the system consists of a lumbar support with two air cushions, then to execute one function or adjust a contour of the seat through the lumbar support, two actuators are in each case simultaneously active, assigned in each case to a valve provided for one of the two air cushions or to another one to inflate or deflate the respective air cushion. For example, in the "VOR" function, both air cushions are simultaneously inflated and thus those two actuators are active which in each case allow air to enter into the air cushion and are thus assigned in each case to that valve which in its open position allows air to be supplied. In the "ZURÜCK" function, on the other hand, both air cushions are simultaneously deflated and therefore those two actuators are active which allow air to flow out of the air cushion and are thus assigned in each case to that valve that in its open position allows air to flow out. In the "AUF" function, one upper air cushion is inflated while a lower one is deflated. Thus, the actuator that allows air to flow out of the lower air cushion and the actuator that allows air to flow into the upper air cushion are simultaneously active. In the "AB" function, on the other hand, a lower air cushion is inflated and an upper one is deflated at the same time. Accordingly, the actuator that allows air to flow out of the upper air cushion and the actuator that allows air to flow into the lower air cushion are simultaneously active.

In a preferred embodiment, one SMA element is assigned to each positioning element of an actuator for its movement in stroke direction, wherein to activate the positioning element between the supply path and the ground path, the SMA elements are integrated into the circuit in such a way that in each case two SMA elements (i.e. two actuators) can be connected pairwise in series in one of the current paths fed with current. Thus, actuators controlled by SMA elements are integrated into the circuit arrangement.

The electronic switching elements include preferably a diode circuit with several diodes and/or one or several transistors, wherein in each case one actuator is assigned to at least one diode. In this case, the activation of the respective current path is primarily controlled by the electronic switching elements, especially the diode circuit and the transistors so that an expensive and bulky control unit can be dispensed with. Here, at least two diodes are especially assigned to each actuator.

To prevent a thermal overload of the actuators or SMA elements, the circuit arrangement includes in a preferred embodiment one current-regulating circuit integrated into the circuit between the actuators that can be connected in each case pairwise in series.

The current-regulating circuit comprises especially a pulse width modulation (PWM) generator that generates a pulse-wide modulated signal with a fixed frequency and a fixed duty cycle in order to continuously turn the flow of current on and off in the respective active current path. Due to the thermal inertia and the fast switching frequency of the PWM generator, the power being supplied to the SMA element equals a constantly supplied power. In other words: The power supplied to the SMA element has the same thermal power as a constantly supplied power.

An astable multivibrator is preferably used as an inexpensive variant of the pulse width modulation generator.

Especially when an astable multivibrator with constant duty cycle is used as a pulse width modulation generator, the current-regulating circuit additionally includes a power source, in particular a temperature-dependent power source. This ensures that the power being supplied to the SMA element remains constant when the supply voltage changes or fluctuates, but changes when there are temperature fluctuations, thus less power with higher temperature and more power with lower temperature. This especially prevents a thermal overload of the SMA elements.

In order to relieve the thermal load on the power source even more and prevent the electronic components of the power source from overheating, a bypass circuit for the power source has been integrated into the current-regulating circuit. Consequently, only one part of the entire current flows through the power source itself, the other part through the bypass. This reduces the power loss in the power source, so that inexpensive electronic components, such as cheap and simple transistors, for example, can be used in the power source. In the simplest case, the bypass circuit itself needs merely one resistance as structural element and is therefore very inexpensive (bypass resistance).

The second task is solved by a system, especially a pneumatically adjustable lumbar support having the characteristics according to aspects of the present disclosure. The system comprises at least two air cushions connected to a pump via a supply line so they can be filled with air and to the ambient atmosphere so they can be deflated. The system also includes valves arranged in each supply line and/or in a line between the air cushion and a connection to the ambient atmosphere or to an opening to the ambient atmosphere or having even the opening to the ambient atmosphere, wherein each valve can be adjusted between an opening position, in which the valve opens the supply line or unlocks the connection to the ambient atmosphere, and a closing position, in which the valve closes the supply line or connection to the ambient atmosphere. The system additionally includes a circuit arrangement to control the valves with a design described above, in which the valves or the actuators controlling the valves are integrated.

The system or lumbar support is especially integrated into the backrest of a seat, for example a car seat in a motor vehicle, in order to adjust or move the contour of the backrest. To adjust the position of the lumbar support and thus to adjust a desired contour of the seat, the air cushions are inflated with varying air volumes or at least partially deflated, achieved by controlling the valves in the circuit arrangement. In a system with two air cushions, there are a total of four active functions and one inactive function that can be implemented via the circuit arrangement. In the "AUF" function, a first, upper air cushion is inflated and a second, lower air cushion is deflated. To inflate the first, upper air cushion, a valve assigned to the first air cushion arranged in the supply line between the first air cushion and the pneumatic pump is opened. To deflate the second, lower air cushion, a valve assigned to the second air cushion arranged between the second air cushion and the ambient atmosphere is opened. The two other valves (i.e. the valve arranged in the supply line between the first air cushion and the ambient atmosphere and the one arranged in the supply line between the second air cushion and the pneumatic pump) remain closed while this happens. The other functions "AB", "VOR" and "ZURÜCK" are analogously achieved by the corresponding pairwise control of the respective valve or valves by the assigned actuators in each case, as will be explained further by means of the embodiment, wherein for all four active functions, two of the valves or actuators can be connected in each case in a common current path and are thus activated or in their active position.

In this case, one actuator with one positioning element is assigned to each valve, wherein the positioning element of the actuator closes a valve opening of the valve in the first or closing position, and unblocks the valve opening of the valve in the second or unblocking position. Here, the valves or actuators are integrated into the circuit arrangement of the system in the way described above.

Preferably, at least two valves or at least two actuators of the circuit are assigned to each air cushion, wherein especially two valves or actuators are assigned to a first air cushion and two valves or actuators are assigned to a second air cushion, in each case in a parallel branch of the circuit. As a result of that, the typically four active functions of the systems can be easily and inexpensively implemented, but without having to accept significant functional limitations.

BRIEF DESCRIPTION OF THE DRAWINGS

The invention is described in more detail below, also with regard to additional characteristics and advantages through the description of embodiments and making reference to the enclosed drawings, each one showing in a schematic diagram.

DETAILED DESCRIPTION

Figure 1:
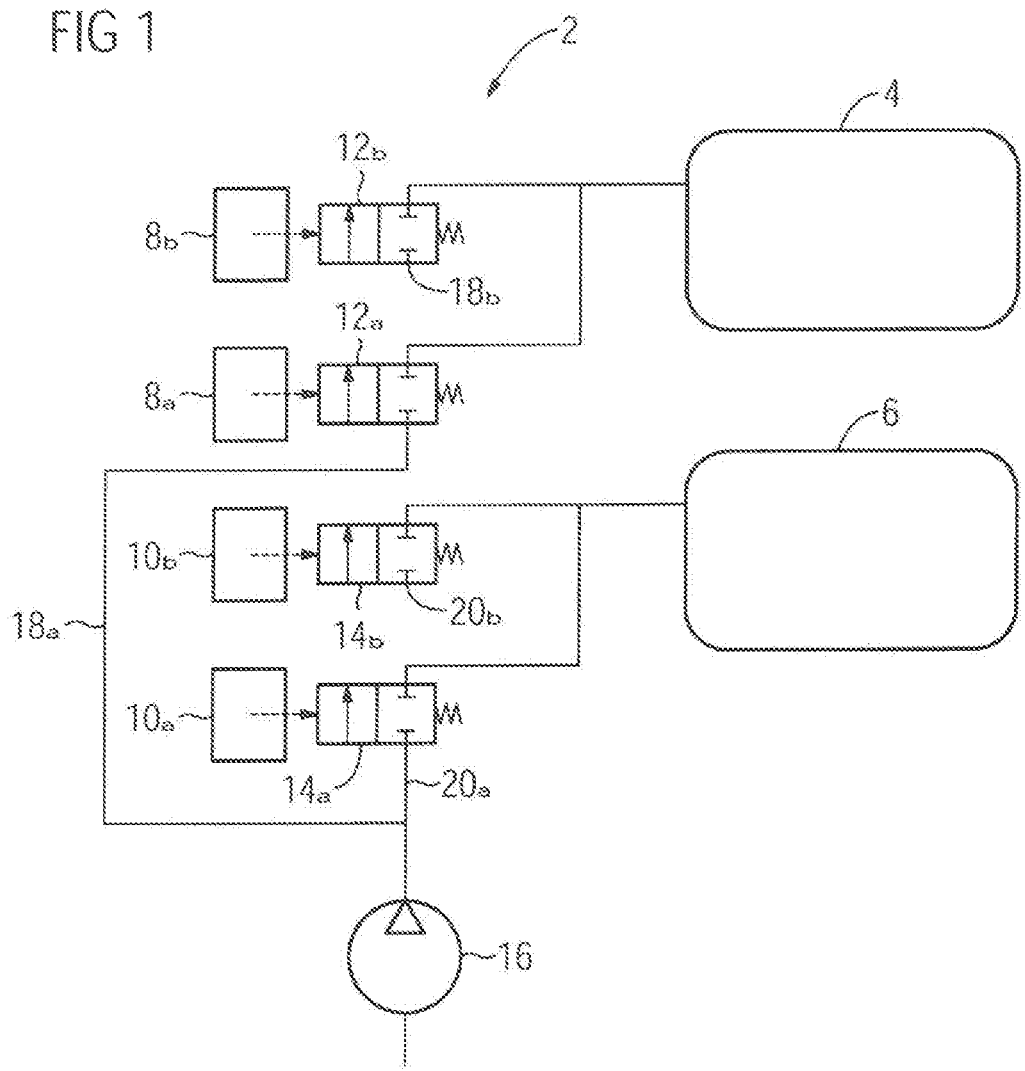
FIG. 1 is a schematic view of a system, in this example a lumbar support, with two air cushions and four valves, each controlled by one actuator.

The system 2 shown in FIG. 1 is a pneumatically adjustable lumbar support for adjusting the contour of a backrest of a car seat (not shown) mounted in it. The system 2 has several air cushions, in this example two air cushions, namely a first, upper air cushion 4 and a second, lower air cushion 6. The air cushions 4, 6 are in each case connected to a pump 16 via a supply line 18a, 20a in order to inflate the air cushions 4, 6 with air. In the supply lines 18a, 20a, a valve 12a, 14a has been arranged in each case between the pump 16 and the air cushion 4, 6, designed preferably as a 2/2-way valve. To deflate the air cushions 4, 6, they are connected to the ambient atmosphere via lines and valves 12b, 14b via an ambient atmosphere connection 18b, 20b or an opening, in which case the valves 12b, 14b, are once again preferably designed as 2/2-way valves. In a respective closing position of the valves 12a, 12b, 14a, 14b, the supply lines 18a, 20a, or ambient atmosphere connections 18b, 20b are closed, so that an air volume present in the air cushions 4, 6 is enclosed in a gastight way. In a corresponding unblocking position of the valves 12a, 12b, 14a, 14b, the respective supply line 18a, 20a or the respective ambient atmosphere connection 18b, 20b is open and the air cushions 4, 6 can be filled with air or deflated.

Depending on the filling level of the two air cushions 4, 6, the lumbar support and therefore backrest contour can be adjusted. In this case, the first, upper air cushion 4 is filled by opening the valve 12a against primary pressure and emptied against ambient atmosphere by opening the valve 12b. The second, lower air cushion 6 is filled against primary pressure by opening the valve 14a and emptied against ambient atmosphere by opening the valve 14b.

Figure 2:
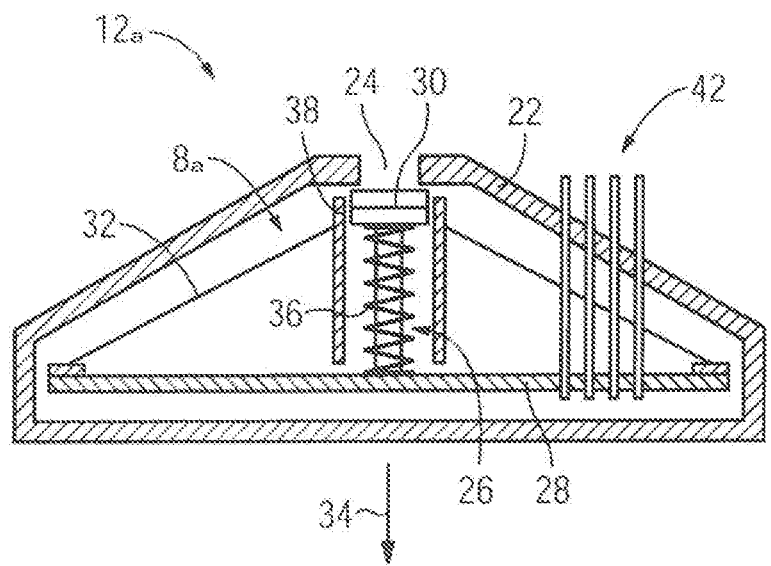
FIG. 2 is a cross-sectional view of a valve as in FIG. 1 with an actuator.

The valves 12a, 12b, 14a, 14b are in each case activated by an actuator 8a, 8b, 10a, 10b, as shown exemplarily in FIG. 2 by means of the valve 12a shown schematically. The other valves 12b, 14a, 14b and actuators 8b, 10a, 10b are designed accordingly. To control the valves 12a, 12b, 14a, 14b or actuators 8a, 8b, 10a, 10b, the system 2 includes a circuit arrangement, which will be explained with more detail below, and in which the valves 12a, 12b, 14a, 14b or actuators 8a, 8b, 10a, 10b are integrated. Here, two valves 12a, 12b, 14a, 14b or two actuators 8a, 8b, 10a, 10b are assigned to each air cushion 4, 6, wherein the two valves 12a, 12b or actuators 8a, 8b assigned to the first air cushion 4 and the two valves 14a, 14b or actuators 10a, 10b assigned to the second air cushion 6 are arranged in each case in a parallel branch of the circuit.

According to FIG. 2, the valve 12a includes a pressure-tight valve housing 22 with a valve opening 24 and a media connection (not shown) to connect an air cushion 4, 6 and a pressure connection (not shown) for connecting the pneumatic pump or an ambient atmosphere connection (not shown) or opening. The actuator 8a, which has a positioning element 26 that can be moved perpendicularly to a circuit board 28, is arranged inside the valve housing 22. The positioning element 26 with a largely cylindrical design has a sealing element 30 at its upper end to seal off the valve opening 24. To guide the positioning element 26, particularly its upper end section, a guide 38 has been provided. A lower end section of the positioning element 26 can additionally be guided into a bore (not shown) of the circuit board 28. To activate the positioning element 26, the actuator 8a has a wire-shaped SMA element 32, which is fixed in a middle section on the positioning element 26 and with its two ends on the circuit board 28. In the current-free state, the SMA element 32 has its maximum length. When current is fed to the SMA element 32, it shortens, the positioning element 26 is moved to its second position in stroke direction 34 and the valve opening 24 is unblocked. If no current is fed to the SMA element 32 any longer, it cools off until it undergoes a transformation from the austenite phase to the martensite phase when it falls below the transformation temperature and is thus lengthened once again. Consequently, the SMA element 32 no longer exerts force on the positioning element 26, the latter moves against stroke direction in return direction to its first position and the valve opening 24 is closed once again by the sealing element 30. A return positioning element 36 (which in this case is a spring) has been mounted on the positioning element 26 that concentrically encloses the positioning element 26 so it can return to its position.

So the actuator 8a, more precisely the SMA element 32, can be fed with current, it has been mounted in the circuit arrangement. The power and signal lines necessary for the operation are connected to the valve 12a via an interface 42.

FIG. 1 shows a system 2 with four valves 12a, 12b, 14a, 14b, in each case activated by an actuator 8a, 8b, 10a, 10b, which therefore unblocks or closes their respective valve opening from the corresponding positioning element of the actuator 8a, 8b, 10a, 10b, which typically has four active switching states and one inactive one, shown schematically in FIGS. 3A to 3E. In the inactive switching state (FIG. 3A), no valve 12a, 12b, 14a, 14b or no actuator 8a, 8b, 10a, 10b is activated or no current flows through any actuator 8a, 8b, 10a, 10b, so that all valve openings are closed. As a result of that, the air volume present in the two air cushions 4, 6 remains unchanged.

Figure 3A:
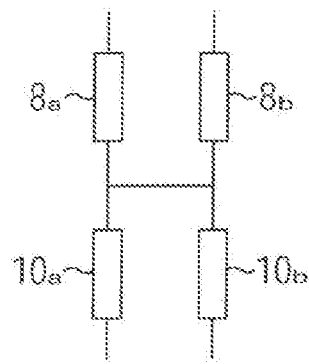
FIGS. 3A-3E are schematic views respectively showing various switching states of the system to the ON position of the lumbar support.
Figure 3B:
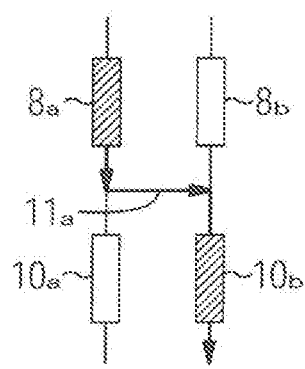

In the switching state shown in FIG. 3B, the actuators 8a, 10b have been activated and thus the valves 12a, 14b are open. If the system 2 is controlled in a certain way, the function "AUF" is implemented, i.e. the first, upper air cushion 4 is inflated and the second, lower air cushion 6 is deflated. To achieve this, a current path 11a of the circuit arrangement connected in series to the actuators 8a, 10b is activated and current flows through it, thereby activating the positioning elements of the actuators 8a, 10b.

Figure 3C:
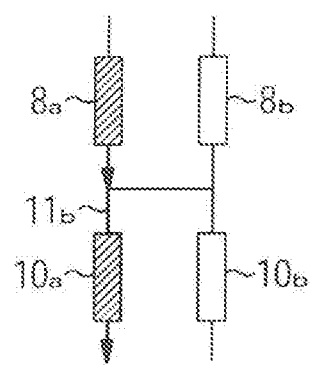

In the switching state shown in FIG. 3C, the actuators 8a, 10a are activated and thus the valves 12a, 14a open, in order to execute the function "VOR", i.e. both the first, upper air cushion 4 and the second, lower air cushion 6 are filled with air. To achieve this, a current path 11b connected in series to the actuators 8a, 10a is closed and current flows through it, thereby activating the positioning elements of the actuators 8a, 10a.

Figure 3D:
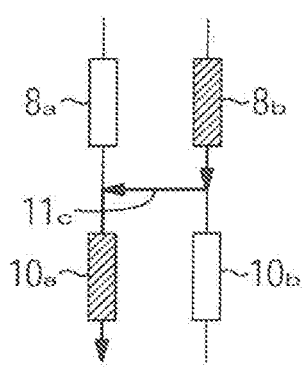

FIG. 3D shows the switching state for the "AB" function, in which the current path 11c connected in series to the actuators 8b, 10a is closed, thereby opening the valves 12b, 14a in order to empty the first, upper air cushion 4 and empty the second, lower air cushion 6.

Figure 3E:
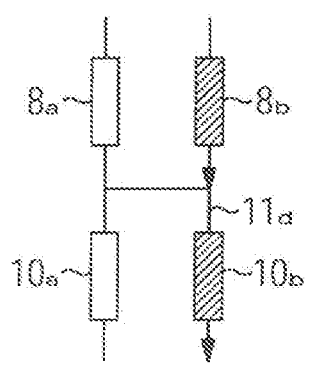

In the switching state shown in FIG. 3E, the actuators 8b, 10b are activated and thus the valves 12b, 14b opened. To achieve this, a current path 11d connected in series to the actuators 8b, 10b is activated and therefore current flows through it, thereby activating the positioning elements of the actuators 8b, 10b. As a result of this, the "ZURÜCK" function is implemented, i.e. both air cushions 4, 6 are emptied.

The four current paths 11a, 11b, 11c, 11d are formed in the circuit arrangement in this way because the circuit includes a parallel circuit with two parallel branches, wherein in each one of the at least two parallel branches at least two actuators 8a, 8b or 10a, 10b are arranged in series, namely the actuators 8a, 8b assigned to the first air cushion 4 in a first parallel branch and the actuators 10a, 10b assigned to the second air cushion 6 in a second parallel branch. The "VOR" and "ZURÜCK" functions can be carried out by feeding one of the current paths 11b, 11d formed by one of the parallel branches. Furthermore, the at least two parallel branches of the parallel circuit can be connected in such a way to one another through an additional branch that an actuator 8a, 8b arranged in a first parallel branch can be connected in series with an actuator 10a, 10b arranged in a second parallel branch, shown by current paths 11a, 11c, in order to be able to carry out the "AUF" and "AB" functions.

Figure 4:
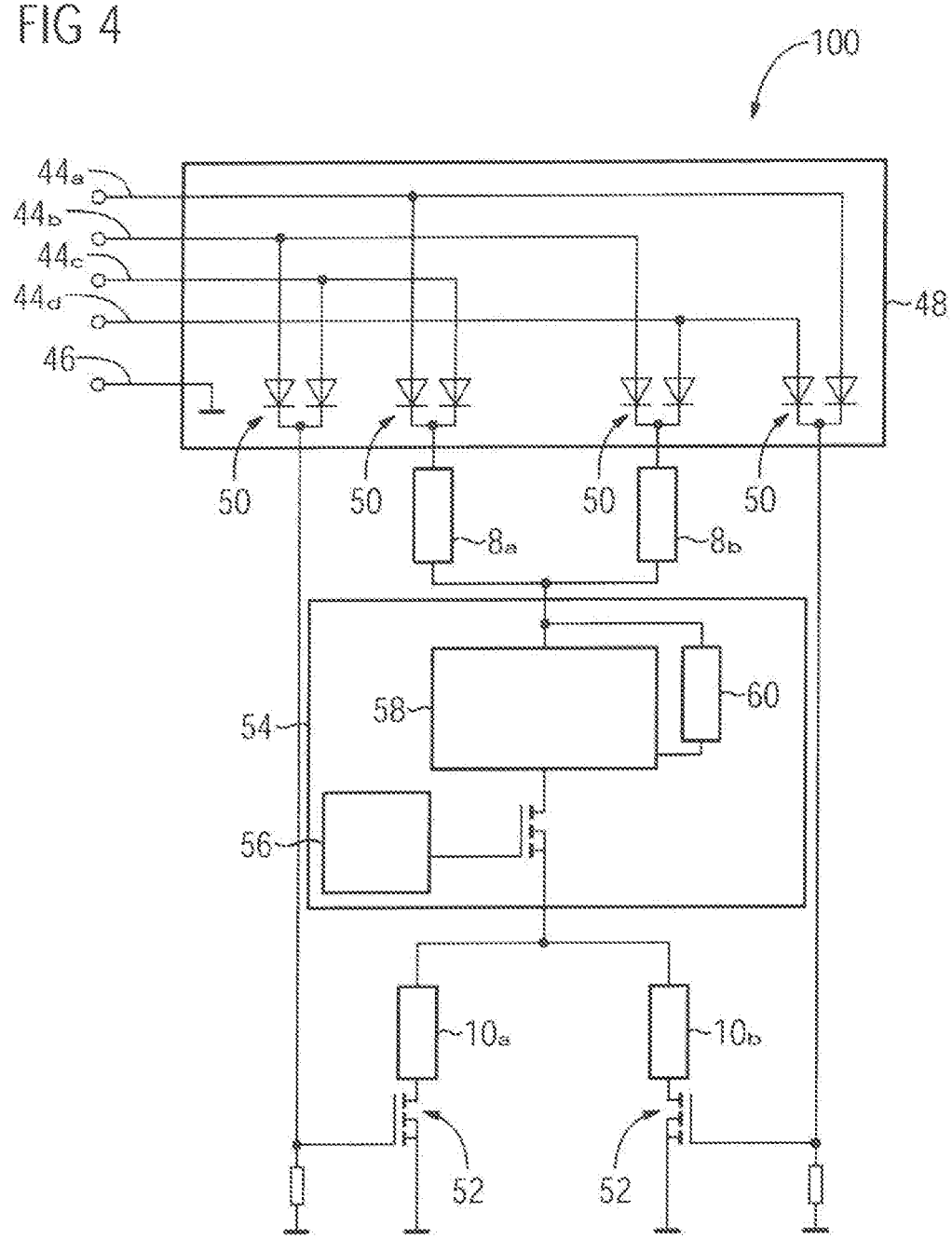
FIG. 4 is a circuit diagram according to the present disclosure.

FIG. 4 shows a circuit arrangement 100 to control the system 2, using as an example a pneumatically adjustable lumbar support with two air cushions 4, 6, shown in detail according to the present invention. As already described, the circuit arrangement 100 comprises four actuators 8a, 8b, 10a, 10b each one with at least one positioning element 26, in each case adjustable between one first position and a second position in order to open or close a valve opening. The four actuators 8a, 8b, 10a, 10b are integrated into the circuit between the voltage supply paths 44a, 44b, 44c, 44d and a ground path 46 that the four possible current paths 11a, 11b, 11c, 11d form among them. To carry out one of the functions, two of the at least four actuators 8a, 8b, 10a, 10b are connected pairwise according to the way shown in FIGS. 3B to 3E and in series in one of the current paths 11a, 11b, 11c, 11d and current is fed to them. In other words: So a desired function can be carried out, two of the actuators 8a, 8b, 10a, 10b are activated by letting current flow through the current path 11a, 11b, 11c, 11d assigned to the respective function to activate it.

The selection or activation of the respective current path 11a, 11b, 11c, 11d and thus of the two actuators 8a, 8b, 10a, 10b that should be activated in order to open the valves 12a, 12b, 14a, 14b assigned in each case, takes place here by means of electronic switching elements integrated into the circuit arrangement 100. So it can move in stroke direction, each positioning element 26 of each actuator 8a, 8b, 10a, 10b is assigned to one SMA element 32 (see FIG. 2), wherein the SMA elements 32 are integrated into the circuit and current is fed to them for the activation of the positioning element 26 between the voltage supply path 44a, 44b, 44c, 44d and the ground path 46.

To activate or close one of the current paths 11a, 11b, 11c, 11d, the electronic switching elements include one diode circuit 48 with several diodes 50, in this case eight diodes 50, wherein two diodes are assigned to each actuator 8a, 8b, 10a, 10b. Furthermore, the electronic switching elements include several transistors 52, in this case two transistors 52. Thus, the activation of one of the current paths 11a, 11b, 11c, 11d takes place solely by the electronic switching elements 48, 50, 52, thereby dispensing with an additional control unit and saving the expense.

To prevent a thermal overload of the actuators 8a, 8b, 10a, 10b or their SMA elements caused by supplying too much power owing to fluctuating supply voltage, the circuit arrangement 100 has a current-regulating circuit 54 that is integrated into the circuit between the actuators 8a, 8b, 10a, 10b that can be connected pairwise in series or between the actuators 8a, 8b assigned to the first, upper air cushion 4 and the actuators 10a, 10b assigned to the second, lower air cushion 6.

The current-regulating circuit 54 comprises a pulse width modulation generator, in this case an astable multivibrator 56, and a temperature-dependent power source 58. In addition, a bypass circuit 60 with an ohmic resistance R_Bypass is integrated into the current-regulating circuit in order to reduce the thermal load on the power source 58 itself.

Figure 5:
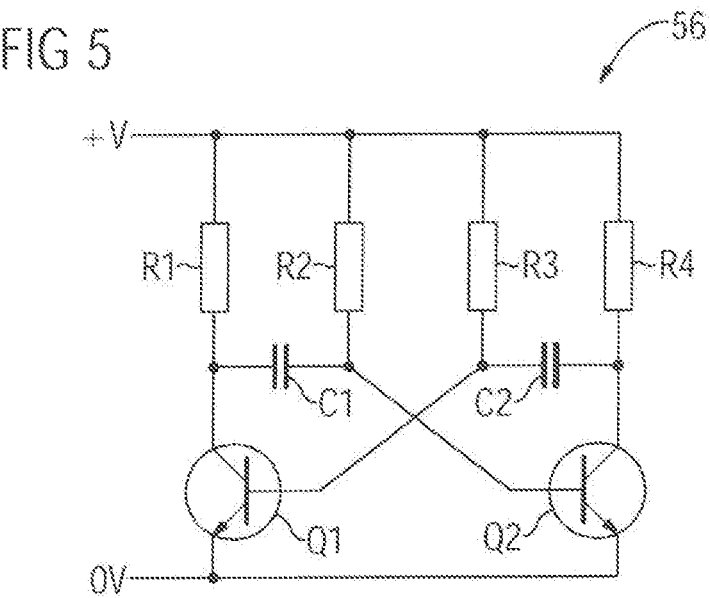
FIG. 5 is a circuit diagram of an astable multivibrator.

FIG. 5 shows a circuit diagram of the astable multivibrator 56, used here as PWM generator because it represents an inexpensive version. The PWM generator generates a pulse-wide modulated signal with a fixed frequency and a fixed duty cycle so the flow of current can be continuously turned off and on. In a duty cycle of 25%, for example, this means that the power is on 25% of the time and off 75% of the time. The frequency and duty cycle of the astable multivibrator 56 are set in a fixed way by dimensioning the used resistances R1, R2, R3 and R4 as well as using the capacitors C1 and C2. Modulating the pulse width reduces the middle power being supplied to the SMA elements, thereby preventing a thermal overload of the SMA elements.

Figure 6:
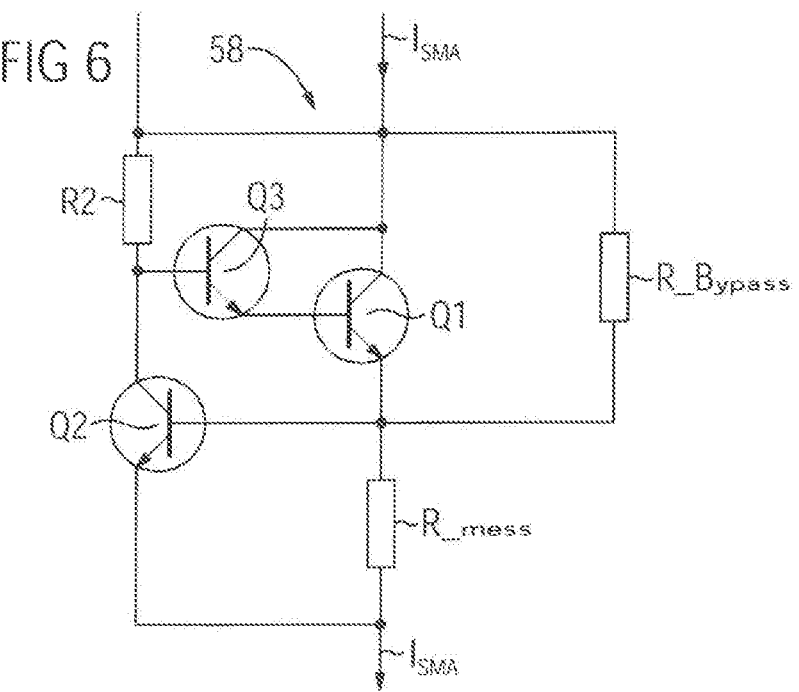
FIG. 6 is a circuit diagram of a power source.

In order to also take the supply voltage fluctuations into account, a temperature-dependent power source 58 with a design according to the circuit diagram shown in FIG. 6 is additionally integrated into the current-regulating circuit 54, as already mentioned. The transistor Q1 is in amplifier mode, i.e. it is opened only so much until it generates a voltage drop due to the current $I_{SMA}$ flowing through a resistance R_mess, which is as large as a forward voltage of a transistor Q2. This makes the transistor Q2 start conducting and provides negative feedback through Q3, so that a certain current $I_{SMA}$ occurs. Thus, by dimensioning the R_mess, the current $I_{SMA}$ can be set largely in a constant way with uniform ambient temperature. To do this, R2 is selected to have very high ohms. Since the forward voltage of the transistor Q2 is temperature dependent, it is also possible to achieve a temperature-dependent ON position of the current $I_{SMA}$ by selecting the transistor Q2 accordingly.

If the entire current $I_{SMA}$ would flow through the transistor Q1, it would heat up very much owing to the resulting power loss. This could be prevented, for example, by designing the housing of transistor Q1 accordingly large in order to discharge the resulting power loss to the surroundings. However, since a compact design is especially desirable in a car seat and such heat-resistant transistors are expensive as well, a bypass circuit 60 has been integrated into the current-regulating circuit 54. By connecting the R_Bypass in parallel to the power source 58, only a part of the current $I_{SMA}$ flows through the transistor Q1. The other part of the current $I_{SMA}$ flows through the bypass circuit 60, so that a part of the resulting power loss is also discharged through the resistance R_Bypass. This reduces the power loss of the transistor Q1 and a compact and inexpensive transistor model can be selected for it.

In short, it can be said that the circuit arrangement 100 can be built by a combination of "H-arrangement" of the actuators 8a, 8b, 10a, 10b and of the used current-regulating circuit 54 with few and inexpensive parts such as diodes, transistors, resistances and capacitors without limiting functionality. The circuit arrangement 100 can be used regardless of the magnitude of the supply voltage. In addition, a precisely defined current $I_{SMA}$ flows through the actuators 8a, 8b, 10a, 10b and thus allows a temperature-independent power of the actuators 8a, 8b, 10a, 10b to be set.

| List of reference characters | | | |
|---|---|---|---|
| 2 | System | 28 | Circuit board |
| 4 | First, upper air cushion | 30 | Sealing element |
| 6 | Second, lower air cushion | 32 | SMA element |
| 8, 8a, 8b | Actuators of first, upper air cushion | 34 | Stroke direction |
| | | 36 | Return element |
| 10, 10a, 10b | Actuators of second, lower air cushion | 38 | Guide |
| | | 42 | Interface |
| 11a, 11b, 11c, 11d | Current path | 44a, b, c, d | Supply voltage path |
| 12, 12a, 12b | Valves | 46 | Ground path |
| 12, 14a, 14b | Valves | 48 | Electronic switching elements |
| 16 | Pump | 50 | Diode |
| 18a, 20a | Supply line | 52 | Transistor |
| 18b, 20b | Ambient atmosphere | 54 | Current-regulating circuit |
| 22 | Valve housing | 56 | Astable multivibrator |
| 24 | Valve opening | 58 | Power source |
| 26 | Positioning element | 60 | Bypass |
| | | 100 | Circuit arrangement |

I claim:

1. A system including a pneumatically adjustable lumbar support, the system comprising:
at least two air cushions, each air cushion being connected to a pump for filling the air cushion with air via a supply line, each air cushion also being connected to the ambient atmosphere via an atmosphere connection for emptying the air cushion, wherein, for each air cushion, a valve is located at least in one of a respective supply line of the air cushion and between the air cushion and the respective atmosphere connection, the valve being adjustable between an opening position, in which the valve one of opens the supply line and unblocks the atmosphere connection, and a closing position, in which the valve one of closes the supply line and closes the atmosphere connection; and
a circuit arrangement including:
at least four actuators each actuator having at least one positioning element, each positioning element being adjustable between a first position and second position;
at least one voltage supply path and one ground path which form at least four current paths between respective ones of the voltage supply paths and the ground path, wherein the at least four actuators are integrated in pairs into a circuit between the voltage supply path and ground path so that each pair of the actuators are connectable in series in one of the current paths and fed with current to activate a respective positioning element; and
electronic switching elements to selectively feed current to at least one of:
none of the current paths, and one of the current paths.

2. The system according to claim 1, wherein one of the actuators is assigned to each valve and the positioning element of the one actuator closes a valve opening of a respective one of the valves in the first position and unblocks the valve opening of the respective one of the valves in the second position.

3. The system according to claim 1, wherein at least two of the actuators are assigned to each air cushion, wherein two actuators assigned to a first air cushion and two actuators assigned to a second air cushion are arranged in a respective parallel branch of the circuit.

4. The system according to claim 1, the circuit arrangement further including one current-regulating circuit integrated into the circuit between the pairs of actuators connected in series, wherein the current-regulating circuit includes one power source and a bypass circuit for the power source.

* * * * *